United States Patent [19]

Fujiwara et al.

[11] 4,033,840

[45] July 5, 1977

[54] THERMOSETTING ACRYLOYLOXY-TERMINATE BUTADIENE POLYMERS

[75] Inventors: Yoshio Fujiwara; Keiichi Naito; Yoshinobu Fujimoto, all of Utsunomiya; Tooru Odashima, Kanuma; Tomohiko Sada, Tokyo, all of Japan

[73] Assignee: Sony Corporation, Tokyo, Japan

[22] Filed: Feb. 6, 1975

[21] Appl. No.: 547,701

Related U.S. Application Data

[63] Continuation-in-part of Ser. No. 389,213, Aug. 17, 1973, abandoned.

[30] Foreign Application Priority Data

Aug. 21, 1972 Japan .............................. 47-82789

[52] U.S. Cl. ..................... 204/159.17; 204/159.15; 204/159.16; 260/879; 260/880 R; 260/885; 361/398

[51] Int. Cl.$^2$ ...................... C08F 8/00; C08L 9/00; C08L 31/02

[58] Field of Search ................. 204/159.15, 159.16, 204/159.17; 260/836, 879, 880 R, 885

[56] References Cited

UNITED STATES PATENTS

| | | | |
|---|---|---|---|
| 3,455,801 | 7/1969 | D'Alelio | 204/159.19 |
| 3,733,370 | 5/1973 | Thompson et al. | 260/862 |
| 3,899,611 | 8/1975 | Hall | 427/54 |

*Primary Examiner*—Murray Tillman
*Assistant Examiner*—Thurman K. Page
*Attorney, Agent, or Firm*—Lewis H. Eslinger; Alvin Sinderbrand

[57] ABSTRACT

A thermosetting resin composition having improved properties as an electrical insulating material and being particularly suited for use in printed circuit boards, consists essentially of an acryloyloxyl- or methacryloyloxyl- terminated butadiene homopolymer or copolymer, for example, with acrylonitrile or styrene, an ethylenically unsaturated monomer capable of copolymerizing with the terminating acryloyloxyl or methacryloyloxyl groups of the butadiene homopolymer or copolymer, and an acid anhydride containing at least one ethylenically unsaturated group in its molecule. In preferred compositions of the invention, there are from 1.5 to 3.0 terminating acryloyloxyl or methacryloyloxyl groups per molecule of the butadiene homopolymer or copolymer, and the amounts of the ethylenically unsaturated monomer and of the acid anhydride are from 50 to 200 weight percent and from 5 to 20 weight percent, respectively, based on the weight of the terminated butadiene homopolymer or copolymer. A particularly desirable composition is obtained when the acryloyloxyl- or methacryloyloxyl-terminated polymer or copolymer is at least 70 weight percent 1,2-polybutadiene.

6 Claims, No Drawings

THERMOSETTING ACRYLOYLOXY-TERMINATE BUTADIENE POLYMERS

CROSS REFERENCE TO RELATED APPLICATION

This application is a continuation-in-part of U.S. patent application Ser. No. 389,213, filed Aug. 17, 1973, now abandoned.

BACKGROUND OF THE INVENTION

1. Field of the Invention

This invention relates to thermosetting resins for use as electrical insulating materials and the like.

2. Description of the Prior Art

Among the resins heretofore employed as electrical insulating materials are silicones, polytetrafluoroethylenes, polyimides, epoxy resins, polyesters, phenolic resins, diallyl phthalate resins and so on. The silicones, polytetrafluoroethylenes, polyimides and the like are expensive and hence only used for special purposes. The epoxy resins, phenolic resins, polyesters, diallyl phthalate resins and so on are widely used, but they do not have excellent electrical characteristics or adequate flexibility. From the viewpoint of electrical characteristics, thermoplastic resins, such as, polyethylene, are excellent, but they have poor heat resistance, and hence are limited in use. A resin for use as electrical insulation, especially a resin for impregnation of glass cloth, as in a printed circuit board, or moulding, should have excellent electrical characteristics and also be of a low-viscosity, non-solvent type. Further, resins for printed circuit boards and flexible printed wiring, in addition to having excellent electric characteristics and good impregnating properties, must have good chemical resistance to withstand the process used in fabrication of a printed circuit board and also good mechanical characteristics after being hardened.

Recently, various studies have been conducted on the use for the above purposes of polymers composed mainly of butadiene because of the excellent electrical characteristics of such polymers. The previously available polymers composed principally of butadiene are liquid and of low molecular weight within a very narrow range, and, further, their end groups are terminated with reactive functional groups such as hydroxyl groups, carboxyl groups and the like. However, satisfactory resin compositions for printed wiring or circuit boards have not been obtained up to now. For example, in Japanese Patent Application Publications Nos. 14538/71 and 10672/71, a hydroxyl-terminated butadiene polymer is modified with an $\alpha$, $\beta$-unsaturated acid, or mixed with that acid, and then hardened by copolymerizing with a vinyl monomer in the presence of a suitable peroxide as a hardening agent. However, the hardening speed is low in the case where the hydroxyl-terminated butadiene polymer is modified with the $\alpha$, $\beta$-unsaturated acid, and the copolymerizing is only poorly achieved in the case where the hydroxylterminated butadiene polymer is only mixed with the acid.

OBJECT AND SUMMARY OF THE INVENTION

Accordingly, it is an object of this invention to provide improved thermosetting resin compositions suited for use as electrical insulating materials and having excellent electrical and mechanical characteristics and superior chemical resistance.

Another object is to provide thermosetting resin compositions, as aforesaid, which are particularly suited for use in printed circuit boards, and with which adequate hardening of the resin composition is achieved even at the surfaces of the printed circuit board contacted by electrolyzed copper foils.

The thermosetting resin compositions according to this invention are based on the discovery by the present inventors that the copolymerizing of a liquid butadiene homopolymer or copolymer with an ethylenically unsaturated or vinyl monomer during either peroxide hardening or light hardening with a photosensitizer is improved when the polymer or copolymer is terminated with either acryloyloxyl

groups or methacryloyloxyl

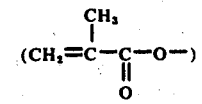

groups.

Further, the present inventors have discovered that gelation at an early stage of the above mentioned copolymerization of the terminated-butadiene homopolymer or copolymer with the vinyl monomer is promoted by the addition thereto of an acid anhydride containing at least one ethylenically unsaturated group in its molecule. The foregoing is of particular importance in respect to the manufacture of printed ciruit boards having electrolyzed copper foil applied against one or more of the surfaces of a sandwich of resin impregnated glass cloth, and in which the peroxide or light hardening of the resin at the confronting surface of the foil is deleteriously affected by the presence of the latter. It has been found that such problem is not susceptible to any chemical solution, other than by the promotion of the gelation at an early stage of the copolymerization, as described above.

It has also been found that the hardening and electrical properties of the thermosetting resin compositions according to this invention are further improved when a major proportion, for example, at least 70 weight percent, of the liquid butadiene polymer or copolymer is constituted by 1,2-polybutadiene.

Accordingly, a thermosetting resin composition according to this invention consists essentially of a butadiene-containing resin selected from the group consisting of acryloyloxyl- and methacryloyloxyl-terminated butadiene homopolymers and copolymers, at least one ethylenically unsaturated or vinyl monomer which is capable of copolymerizing with the terminating groups of the butadiene-containing resin, and at least one ethylenically unsaturated acid anhydride.

Various methods exist for obtaining the butadiene homopolymer or copolymer terminated with acryloyloxyl or methacryloyloxyl groups. For example, a reactive acrylate or methacrylate having a hydroxyl group, such as 2-hydroxyethyl acrylate, 2-hydroxyethyl methacrylate or the like, is first reacted with a compound having two different reactive isocyanate groups, such as, 2,4 tolylene-diisocyanate, and the resulting reaction product is then reacted with the end hydroxyl groups of an hydroxyl-terminated butadiene homopolymer or copolymer. It is also possible to cause an acid chloride, such as, an acrylic chloride or methacrylic chloride, to react directly with an hydroxyl-terminated butadiene homopolymer or copolymer for terminating the latter with the desired acryloyloxyl or methacryloyloxyl groups. Further, the terminating acryloyloxyl or methacryloyloxyl groups can be directly introduced on a carboxyl-terminated butadiene homopolymer or copolymer by esterification of the latter with a reactive acrylate or methacrylate having an epoxy group, such as, glycidyl methacrylate, in the presence of an acid, amine or other suitable catalyst.

Among the commercially available hydroxyl-terminated butadiene homopolymers that can be used as starting materials in the above-described methods for producing the acryloyloxyl- or methacryloyloxyl-terminated compounds are:

NISSO-PB-G2000: (1,4-trans 10% 1,2-vinyl 90%, about 2.0 hydroxyl-terminals per molecule, viscosity about $1.8 \times 10^6$ CPS by Brookfield viscometer at 25° C, from Nihon Soda Co., Ltd.);

R - 15M: (1,4-trans 60% 1,4cis 20%, 1,2-vinyl 20%, average molecular weight about 3300, about 2.3 hydroxyl-terminals per molecule, viscosity about $2.2 \times 10^4$ CPS by Brookfield viscometer at 30° C, from ARCO Chem. Co., Ltd.); and R - 45M: (1,4-trans 60% 1,4-cis 20%, 1,2-vinyl 20%, average molecular weight about 2600, about 2.3 hydroxyl-terminals per molecule, viscosity about $5.0 \times 10^3$ CPS viscosity by Brookfield viscometer at 30° C, from ARCO Chem. co., Ltd.).

Among the commercially available hydroxyl-terminated butadiene copolymers that can be used as starting materials are:

CS - 1,2: (1,4-trans 60% 1,4-cis 20%, 1,2-vinyl 20%, average molecular weight about 2600, about 2.7 hydroxyl-terminals per molecule, viscosity about $2.3 \times 10^4$ CPS by Brookfield viscometer at 30° C, from ARCO Chem. Co., and which is a copolymer of butadiene and acrylonitrile in the ratio, by weight of 75:25.); and CN - 15: (1,4-trans 60% 1,4-cis 20%, 1,2-vinyl 20%, 2.7 hydroxyl-terminals per molecule, viscosity about $5.0 \times 10^4$ CPS by Brookfield viscometer at 30° C, from ARCO Chem. Co., Ltd. and which is a copolymer of butadiene and styrene in the ratio, by weight, of 85:15).

Among the commercially available carboxyl-terminated butadiene homopolymers that can be used as starting materials for producing the acryloyloxyl- or methacryloyloxyl-terminated butadiene homopolymers are:

NISSO-PB-C-2000: (1,4-trans 10% 1,2-vinyl 90%, average molecular weight about 2000, about 2.0 carboxyl-terminals per molecule, viscosity about $4.0 \times 10^6$ CPS by Brookfield viscometer at 25° C, from Hihon Soda Co., Ltd.); and Hycar CTB: (1,4-trans 53% 1,4-cis 22%, 1,2-vinyl 25%, average molecular weight about 4370, about 2.0 carboxyl-terminals per molecule, viscosity about $2.5 \times 10^4$ CPS by Brookfield viscometer at 27° C, from B.F. Goodrich Co., Ltd.).

Among the commercially available carboxyl-terminated butadiene copolymers that can be used as starting materials is:

Hycar CTBN: (1,4-trans 64% 1,4-cis 24%, 1,2-vinyl 12%, average molecular weight about 3270, about 1.7 carboxyl-terminals per molecule, viscosity about $1.2 \times 10^5$ CPS by Brookfield viscometer at 27° C, from B. F. Goodrich Co., Ltd. and which is a copolymer of butadiene and acrylonitrile in the ratio, by weight, of 81:19).

A methacryloyloxyl-terminated butadiene homopolymer that is suitable for inclusion in thermosetting resin compositions according to this invention is also available commercially under the trade-name NISSO-PB-TE-2000 from Nihon Soda Co. Ltd. and has a viscosity of about $3.6 \times 10^5$ CPS by Brookfield viscometer at 40° C. Such product is produced by reacting the hydroxyl-terminated butadiene homopolymer Nisso-PB-G-2000, referred to above, with the reaction product of 2-hydroxyethyl methacrylate and 2,4-tolylene-diisocyanate.

It is preferable that the butadiene homopolymer or copolymer which is terminated with acryloyloxyl or methacryloyloxyl groups have an average molecular weight in the range from 1000 to 5000 so as to provide the thermosetting resin composition according to this invention with a viscosity that is suitable for use of the composition for impregnation or moulding.

When a butadiene copolymer is employed, the proportion of butadiene in the copolymer should be at least 70 weight percent. Further, copolymers of butadiene with styrene or acrylonitrile are preferred in order to provide the thermosetting resin composition according to this invention with desirable electrical characteristics, particularly in respect to the dielectric constant and surface resistance thereof.

In order to provide the desirable fast initiation of gelatinization in the hardening process, the butadiene homopolymer or copolymer included in the thermosetting resin composition according to this invention should be terminated with from 1.5 to 3.0 acryloyloxyl or methacryloyloxyl groups per molecule of the polymer. Further, the most desirable electrical characteristics, such as, dielectric constant and surface resistance, and the most desirable mechanical properties are obtained with the final thermoset resin composition according to the invention when the acryloyloxyl- or methacryloyloxyl-terminated butadiene-containing resin is butadiene homopolymer, and particularly butadiene homopolymer containing at least 70 weight percent of 1,2-polybutadiene.

Monomers for use in the thermosetting resin compositions of this invention have to be capable of copolymerization with the end vinyl of isopropenyl groups of the acryloyloxyl- or methacryloyloxyl groups of the butadiene polymer and have to serve as good solvents for such polymer. Among suitable vinyl monomers are styrene, divinyl-benzene, methyl methacrylate, methyl acrylate, glycidyl methacrylate, ethylene dimethacrylate and the like.

The amount of such vinyl monomer is the thermosetting resin composition according to this invention should be between about 50 and 200 weight percent based on the amount of the acrloyloxyl- or methacryloyloxyl-terminated butadiene homopolymer of copolymer in the composition. If the amount of the vinyl monomer is less than 50 weight percent, the viscosity of the resin composition according to this invention is initially too high for its use in impregnating glass or polyester cloth or in moulding. If the amount of vinyl monomer is substantially greater than 200 weight percent, then the electrical characteristics and flexibility of the thermoset resin composition are deleteriously affected. For example, in the case of a thermosetting resin composition employing NissO-PB-TE-2000 as the methacryloyloxyl-terminated butadiene homopolymer, 50 weight percent of styrene in the composition provides a viscosity of 1500 CPS, 100 weight percent of styrene provides a viscosity of 130 CPS, and 200 weight percent of styrene provides a viscosity of 20 CPS, all measured by a Brookfield viscometer at 20° C.

Acid anhydrides having at least one ethylenically unsaturated group in their molecule, and which are suitable for use in the thermosetting resin compositions according to this invention, should be soluble in the above mentioned butadiene containing resins and monomers and contribute to the copolymerization thereof and further serve to promote gelatinization of the resin composition. Among suitable acid anhydrides are maleic anhydride, itaconic anhydride, methyl-endo-methylene tetrahydrophthalic anhydride (for example, available commercially under the tradename Anhydride methyl-CD acid from Nihon Kayaku Co., Ltd. and having the structural formula shown below), methyl tetrahydrophthalic anhydride (for example, available commercially under the tradename HN-2000 from Hitachi Kasei Co., Ltd., and having the structural formula shown below), tetrahydrophthalic anhydride, dodecenyl succinic anhydride (having the structural formula shown below), and the like.

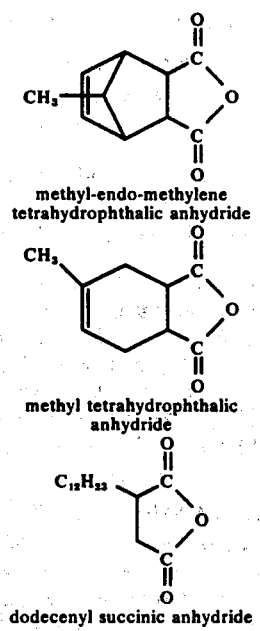

methyl-endo-methylene tetrahydrophthalic anhydride methyl tetrahydrophthalic anhydride dodecenyl succinic anhydride The amount of acid anhydride in the thermosetting resin compositions according to this invention is preferably in the range between about 5 and 20 weight percent based on the amount of the acryloyloxyl- or methacryloyloxyl-terminated butadiene homopolymer or copolymer in the composition. If the amount of acid anhydride is less than 5 weight percent, the effect thereof in promoting gelatinization is undesirably decreased, particularly in the initial copolymerization stages. If more than 20 weight percent of the acid anhydride is employed, the electrical characteristics and chemical resistancce of the hardened resin composition are adversely affected.

The thermosetting resin compositions according to the invention may also include conventional peroxide hardening agents or photosensitizers for promoting light hardening. Among the peroxides suitable for hardening the thermosetting resin compositions according to this invention are benzoyl peroxide, lauroyl peroxide, dicumyl peroxide, methyl ethyl ketone peroxide, cumene hydroperoxide and so on. Among the photosensitizers suitable for light hardening of the resin compositions according to this invention are benzoin, benzophenone, benzoin ethyl ether, 2-methyl-anthra-quinone and so on. The amount of peroxide or photosensitizer is preferably in the range between 0.1 and 2 weight percent based on the total weight of the resin composition.

The invention will be further explained with reference to the following illustrative examples in which all parts, percentages and proportions are by weight, unless otherwise indicated:

EXAMPLE I

100 Parts of the carboxyl-terminated butadiene polymer available commercially under the tradename Nisso-PB-C-2000 and of which more than 80% is 1,2-polybutadiene was dissolved in 25 parts of styrene and to the solution was added 20 parts of glycidyl methacrylate, 0.08 parts of hydroquinone and 0.5 parts of sulfanilic acid. The resulting mixture was uniformly stirred at 90° C for six hours to obtain a brownish red reaction product. From the fact that, in an infrared absorption spectrum, absorption of an epoxy group in the neighborhood of 1230, 930 and 830 cm$^{-1}$ had disappeared, and further from the fact that wide absorption of the hydroxyl group in the vicinity of 3400cm$^{-1}$ had increased, it was ascertained that the reaction of the terminal carboxyl group of the butadiene polymer with the glycidyl group had taken place.

40 parts of the above reaction product, 3 parts of maleic anhydride, 25 parts of styrene monomer, 0.2 parts of benzoyl peroxide and 0.3 parts of cumene hydroperoxide were homogeneously mixed and dissolved to obtain a resin composition having a viscosity of 35 CPS (25° C).

The resin composition thus obtained was formed into a film and hardened by heating it at 100° C for 10 minutes and at 120° C for 15 hours, so as to provide a transparent film about 0.1mm thick.

The tensile strength of the film was 67 Kg/cm$^2$ (1mm × 10mm, pulling speed: 50mm/min. and measured by Tensilox MT-4). The loss by the Soxhlet extraction procedure using trichloroethylene for 1 hour was 6.63 weight percent.

10 sheets of glass cloth (Nittobo WE116BV) were impregnated with the resin composition prepared as described above and sandwiched or stacked, whereupon electrolyzed copper foils 1 oz. (Gould Co., Ltd. T/C treated copper foils) were applied to both sides of the stack of sheets to provide a copper-clad laminated board. The polymerization of the resin at the surfaces of the copper foils took place sufficiently, and a high-grade board of quality which could not have been obtained with the prior art was achieved. The board thus obtained had a dielectric constant of 3.7 (1MHz, 25° C, ASTM-D-150), a dielectric loss (tan$\delta$) of 0.0004 (1MHz, 25° C, ASTM-D-150) and a surface resistance of 5.5 × 10$^{15}$ Ω.cm (25° C, ASTM-D-257) as its electrical characteristics.

EXAMPLE II 100 parts of the carboxyl-terminated butadiene polymer Nisso PB-C-2000, 25 parts of styrene, 20 parts of glycidyl methacrylate, 0.08 parts of hydroquinone and 0.5 parts of boron trifluroide monoethylamine were reacted at 90° to 110° C for 5 hours to obtain a yellow reaction product.

40 parts of such reaction product, 3 parts of dodecenyl succinic anhydride, 14 parts of styrene, 10 parts of ethylene dimethacrylate and 0.5 parts of benzoyl peroxide were mixed homogeneously to obtain a resin composition having a viscosity of 35 CPS (25° C).

A transparent film was obtained by hardening the resin under the same conditions as described above in Example I. The tensile strength of the film was 60Kg/cm$^2$ and the loss due to extraction with trichloroethylene was 4.40 weight percent. A printed circuit board formed in the same way as in Example I, had a dielectric constant of 3.5 (1MHz, 25° C, ASTM-D-150) a dielectric loss (tan $\delta$) of 0.004 (1MHz, 25° C, ASTM-D-150) and a surface resistance of 7.5 × 10$^{15}$ $\Omega$.cm (25° C, ASTM-D-257).

EXAMPLE III

100 Parts of the carboxyl-terminated butadiene polymer Nisso PB-C-2000, 25 parts of styrene, 20 parts of glycidyl methacrylate, 0.08 parts of hydroquinone and 0.5 parts of 8- oxyquinoline were reacted for 5 hours at 90° to 110° C to obtain a somewhat blackish red reaction product.

A resin composition having a viscosity of 40 CPS (25° C) was otained by mixing 39 parts of the above reaction product, 3 parts of methyl-endo-methylene tetrahydrophthalic anhydride, 15 parts of styrene, 10 parts of ethylene dimethacrylate, 0.2 parts of benzoylperoxide and 0.3 parts of cumene hydroperoxide.

The resin thus obtained was formed under the same conditions as in Example I, to obtain a slightly yellowish film. The tensile strength of the film was 68Kg/cm$^2$ and the loss due to extraction with trichloroethylene was 3.11 weight percent. When this resin composition was used to impregnate a circuit board as in Example I, the dielectric constant was 3.2 (1MHz, 25° C,ASTM-D-150), the tan $\delta$0.003(1MHz, 25° C,ASTM-D-150) and the surface resistance 8.0 × 10$^{15}$ $\Omega$.cm (25° C,ASTM-D-257).

EXAMPLE IV

A resin composition was produced in the same way as in Example III, but with 0.5 parts of benzoin ethyl ether, a photosensitizer, being substituted for the benzoylperoxide and the cumene hydroperoxide.

A sheet of glass cloth (WE116BV) was impregnated with such resin composition in the ratio of 200g/m$^2$ and was placed on the surface of a 1 oz electrolyzed treated copper foil (T/C by Gould Co., Ltd.). A polypropylene film, 25 $\mu$thick, a transparent glass plate, 1 mm thick, were placed aganst opposite sides of the glass cloth and copper foil lamination, and then the assembly was hardened by irradiation with a Toshiba ultraviolet lamp (H440-p) at a distance of 10cm for 4 minutes. The hardening of the resin composition was sufficiently achieved and the peel strength of the copper foil was 1.2Kg/cm.

EXAMPLE V

A product obtained by reacting tolylenediisocyanate (T-100 from Nippon Polyurethane Co., Ltd.) with 2-hydroxyethyl methacrylate at 40° C for 3 hours was added to the hydroxyl-terminated butadiene-acrylonitrile copolymer available under the tradename CN-15 in an amount equivalent with respect to the hydroxyl group of the copolymer CN-15, and the mixtures were reacted at 50° to 60° C for 7 hours, thereby obtaining methacryloyloxyl- terminated butadiene-acrylonitrile copolymer as the reaction product.

50 parts of such reaction product, 40 parts of styrene, 5 parts of maleic anhydride, 10 parts of ethylene dimethacrylate and 1 part of benzoylperoxide were mixed and dissolved to obtain a thermosetting resin composition having a viscosity of 100 CPS (at 25° C).

A film produced by hardening the above resin as in Example I was slightly yellowish. The tensile strength of the film was 50Kg/cm$^2$, the loss due to extraction with trichloroethylene was 5.05%. The dielectric constant of the film was 4.8 (1MHz, 25° C,ASTM-D-150), the tan $\delta$ was 0.007 (1MHz, 25° C, ASTM-D-150) and the surface resistance was 1.5 × 10$^{14}$ $\Omega$.cm (15° C, ASTM-D-257).

When the thermosetting resin composition of this example was employed in producing a laminated board in the manner described above in Example IV, the normal peel strength of the copper foil was 1.8Kg/cm, the peel strength after treatment for cyanide resistance (KCN 10%, 70° C for 30 min) was 1.3Kg/cm, the peel strength after soldering (at 260° C for 20 sec.) was 1.7Kg/cm, and the peel strength after treatment for Trichlene resistance (boiled in trichlorethylene for 30 minutes) was 1.2Kg/cm.

EXAMPLE VI

A thermosetting resin composition having a viscosity of 150 CPS (at 25° C) was produced by dissolving 50 parts of Nisso-PB-TE 2000 that is, butadiene homopolymer terminated with methacryloyloxyl, 50 parts of styrene, 5 parts of dodecenyl succinic anhydride, 0.5 parts of benzoylperoxide and 0.5 parts of lauroyl peroxide.

The resin composition thus obtained was hardened as in Example I to obtain a transparent film. The tensile strength of the film was 86 Kg/cm$^2$, the loss due to extraction with trichloroethylene was 3,36 weight percent. The dielectric constant of the film was 3.2 (1MHz, 25° C,ASTM-D-150), the tan $\delta$ was 0.003 (1MHz, 25° C, ASTM-D-150) and the surface resistance was 7.5 × 10$^{15}$ $\Omega$.cm (1MHz, 25° C, ASTM-D-257).

REFERENCE EXAMPLE A

The function of the maleic anhydride contained in the resin composition of Example I was examined. In the resin composition containing the maleic anhydride, the time required for gelation was 44 sec. on an iron plate held at 120° . C, while in the same resin composition, but without the maleic anhydride, the time required for gelation was 80 sec. Further, when a printed circuit board was formed in the manner described in Example I, but using the resin composition without the maleic anhydride, very substantial effusion of the styrene monomer occurred during the hardening process and full hardening of the resin at the surface of the copper foil could not be achieved.

REFERENCE EXAMPLE B

The importance of terminating the butadiene polymer with either acryloyloxyl or methacryloyloxyl groups was demonstrated by mixing and dissolving 50 parts of hydroxy-terminated butadiene polymer Nisso PB-G-2000, 3 parts of maleic anhydride, 40 parts of styrene, 10 parts of ethylene dimethacrylate and 1.0 part of benzoylperoxide to provide a resin composition having a viscosity of 190 CPS.

A film obtained by hardening the above resin composition was transparent and its tensile strength was 29Kg/cm² and the loss due to extraction with trichloroethylene was 11.2 weight percent.

As compared with the films of Examples I–VI according to the invention, tensile strength of the film of this reference example is low and the amount of trichloroethylene extraction is apreciably large. Further, chemical resistance of a copper-clad laminated board formed with the resin composition of this reference example is not satisfactory with respect to trichloroethylene.

REFERENCE EXAMPLE C

The importance of terminating the butadiene homopolymer or copolymer with acryloyloxyl or methacryloyloxyl groups was further demonstrated by a variation of Example V in which 50 parts of hydroxyl-terminated butadiene-acrylonitrile copolymer CN-15, 40 parts of styrene, 5 parts of maleic anhydride 10 parts of ethylene dimethacrylate and 1.0 benzoylperoxide were mixed and dissolved to obtain a resin composition. A film of this resin was hardened as in Example I, but the hardening was insufficient. Particularly, when this resin composition was used in a copper-clad laminated board, polymerization did not take place at the boundary surface with the copper foil and a copper-clad laminated board of satisfactory properties could not be obtained.

It is shown by the above examples that, although the graft-polymerization from the pendent vinyl groups according to the 1,2-polymerization of butadiene cannot be neglected, polymerization of the vinyl or isopropenyl group of the acryloyloxyl or methacryloyloxyl groups terminating the butadiene homopolymer or copolymer proceeds preferentially and results in the very advantageous final tensile strength and flexibility of the hardened resin composition according to this invention.

Further, it is apparent from the above that the addition of acid anhydrides with ethylenically unsaturated groups promotes the initial gelatinization of the resin compositions according to the invention, and that such resin compositions have good properties for use as an electrical insulator.

Although specific illustrative examples of the invention have been described in detail herein, it is to be understood that the invention is not limited to those precise examples, and that various changes and modifications may be effected therein without departing from the scope or spirit of the invention as defined in the appended claims.

What is claimed is:
1. A thermosetting resin composition consisting essentially of
   a. a butadiene-containing resin having an average molecular weight of 1000 to 5000 and being selected from the group consisting of acryloyloxyl- and methacryloyloxyl-terminated butadiene homopolymers and copolymers of butadiene with acrylonitrile or styrene which contain at least 70 weight percent of butadiene, said butadiene-containing resin having from 1.5 to 3.0 terminating acryloyloxyl or methacryloyloxyl groups per molecule of said butadiene-containing resin;
   b. at least one ethylenically unsaturated monomer which is capable of copolymerizing with said terminating groups of said butadiene-containing resin and which is present in an amount between 50 and 200 weight percent based on said butadiene-containing resin; and
   c. at least one unreacted ethylenically unsaturated acid anhydride selected from the group consisting of maleic anhydride, itaconic anhydride, dodecenyl succinic anhydride, methyl-endo-methylene-tetrahydrophthalic anhydride, tetrahydrophthalic tetrahydrophthalic anhydride and methyltetrahydrophthalic anhydride, and being present in an amount between 5 and 20 weight percent based on said butadiene-containing resin.

2. A thermosetting resin composition according to claim 1 in which said monomer is selected from the group consisting of styrene, divinyl-benzene, methylmethacrylate, methyl-acrylate, glycidyl-methacrylate and ethylene-dimethacrylate.

3. A thermosetting resin composition according to claim 1 in which at least 70 weight percent of said butadiene-containing resin is 1,2-polybutadiene.

4. A thermosetting resin composition according to claim 1 further including a hardening agent in an amount between 0.1 and 2 weight percent based on the total weight of said composition.

5. A thermosetting resin composition according to claim 4 in which said hardening agent is a peroxide selected from the group consisting of benzoyl peroxide, lauroyl peroxide, dicumyl peroxide, methyl ethyl ketone peroxide and cumene hydroperoxide.

6. A thermosetting resin composition according to claim 4 in which said hardening agent is a photo-sensitizer selected from the group consisting of benzoin, benzophenone, benzoin ethyl ether and 2-methylanthraquinone.

* * * * *